United States Patent
Polastri et al.

(10) Patent No.: US 6,924,036 B2
(45) Date of Patent: Aug. 2, 2005

(54) PTFE-BASED AQUEOUS DISPERSIONS

(75) Inventors: Fabio Polastri, Milan (IT); Tiziana Poggio, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 1 day.

(21) Appl. No.: 10/372,077

(22) Filed: Feb. 25, 2003

(65) Prior Publication Data

US 2003/0170462 A1 Sep. 11, 2003

(30) Foreign Application Priority Data

Feb. 28, 2002 (IT) ..................................... MI2002A0403

(51) Int. Cl.⁷ ............................. B05D 1/02; B05D 3/02; B32B 15/08; B32B 27/16
(52) U.S. Cl. ....................... 428/422; 428/457; 427/375; 427/388.4; 427/409; 427/427.5
(58) Field of Search ............................. 427/375, 388.4, 427/427.5, 388.1, 409, 421; 428/421, 422, 457

(56) References Cited

U.S. PATENT DOCUMENTS

| | | | |
|---|---|---|---|
| 2,242,218 A | 5/1941 | László ........................ | 427/316 |
| 3,665,041 A | 5/1972 | Sianesi et al. .............. | 568/601 |
| 3,715,378 A | 2/1973 | Sianesi et al. .............. | 558/283 |
| 4,043,966 A | 8/1977 | Edwards et al. ............ | 524/417 |
| 4,090,993 A | 5/1978 | Attwood et al. ............ | 524/508 |
| 4,864,006 A | 9/1989 | Giannetti et al. ........... | 526/209 |
| 4,990,283 A | 2/1991 | Visca et al. .................. | 516/30 |
| 5,372,220 A | * 12/1994 | Jacobs et al. .............. | 184/6.14 |
| 5,549,836 A | 8/1996 | Moses ........................ | 508/183 |

FOREIGN PATENT DOCUMENTS

| | | |
|---|---|---|
| EP | 0 239 123 | 9/1987 |
| EP | 0 812 891 | 12/1997 |
| EP | 0 851 010 | 7/1998 |
| EP | 0 969 027 | 1/2000 |
| EP | 1 145 722 | 10/2001 |
| WO | 96/13556 | 5/1996 |

* cited by examiner

Primary Examiner—Ramsey Zacharia
(74) Attorney, Agent, or Firm—Arent Fox PLLC

(57) ABSTRACT

Compositions based on PTFE, homopolymer or modified, comprising for 100 parts of the component 1) PTFE:

1) an aqueous nanodispersion of said homopolymer or modified PTFE, having a primary particle diameter from 5 to 100 nm;
2) from 3 to 45 parts by weight of a surfactant or surfactant mixtures;
3) from 0.2 to 20 parts by weight of an organic or inorganic sequestrant, and optionally:

4) from 0 to 60 parts by weight of a solid lubricating compound.

16 Claims, No Drawings

PTFE-BASED AQUEOUS DISPERSIONS

The present invention relates to a (per)fluorinated substance for the metal surface coating, capable to form low thickness films, having the following combination of properties:

excellent adhesion properties on steel and metals, for example aluminum;

low friction coefficient;

crack free;

good wear resistance;

good scratch resistance;

no modification of the finishing degree of treated metal surfaces.

Specifically the invention relates to PTFE or modified PTFE polymers which are used, under the form of their aqueous dispersions or latexes, to obtain films having the combination of the above properties and thicknesses from 0.3 to 10 micron, preferably from 0.5 to 5 micron, still more preferably from 1 to 3 micron.

It is known in the prior art that coatings of fluoropolymers, in particular PTFE, obtained from the corresponding aqueous dispersions or latexes, are used due to their low friction coefficient to obtain surfaces having self-lubricating, antiadhesive and self-cleaning properties, capable to operate at high temperatures having high thermal stability and low flammability. Said coatings are utilized in various application, such for example kitchen utensiles, the industrial antiadhesion and the moving mechanical parts, etc. However fluoropolymer-based coatings have the drawback to have a low adhesion towards steel and metal surfaces in general.

In the prior art to overcome said drawback, the fluoropolymer film adhesion to metal surfaces is obtained by mixing a fluoropolymer aqueous dispersion, for example PTFE, with hydrogenated resins capable to form films, for example polyamidic acid salts. In this way the composition applied on the support stratifies, and the hydrogenated resin concentrates at the interphase with the support to give adhesion, while the fluoropolymer remains on the surface, giving to the obtained coating the antiadhesion properties. To obtain good results with said kind of composition the metal support must be pretreated for example by sandblast and/or etching. Said process has the drawback to need a preliminary step to the film formation phase. Besides, the above pretreatments cannot be used on precision mechanical parts, as gears, print rolls, etc., since for said mechanical parts the finishing and shape must not be modified.

To overcome said drawback in the patent application WO 96/13,556 a primer is used, having a low content of a perfluorinated polymer, which can be applied also on untreated substrata. The used primer is formed by a mixture of PTFE, polyamidic acid salts and silicates or metal oxides. According to said patent application to obtain coatings having antiadhesion properties various steps are required, applying successive fluoropolymer layers. Said repeated steps result disadvantageous from the industrial point of view.

The need was therefore felt to have available (per)fluorinated polymers, in particular based on PTFE, for the coating of metal surfaces, capable to form films having a low thickness from 0.3 to 10 micron, preferably from 0.5 to 5 micron, still more preferably from 1 to 3 micron, with the following combination of properties:

excellent adhesion properties;

low friction coefficient;

crack free;

good wear resistance;

good scratch resistance;

no modification of the finishing degree of treated metal surfaces.

It has been surprisingly and unexpectedly found by the Applicant that particular PTFE dispersions, formed by surfactants and organic or inorganic compounds belonging to the sequestrant class, can be directly applied on metal surfaces without pre-treating the support by sandblast or etching, or mixing the fluoropolymer dispersion with hydrogenated resins.

An object of the present invention is a composition based on PTFE, homopolymer or modified, comprising for 100 parts of of the component 1) PTFE:
1) an aqueous nanodispersion, or latex, of said homopolymer or modified PTFE, having a primary particle diameter from 5 to 100 nm, preferably from 10 to 80 nm;
2) from 3 to 45 parts by weight, preferably from 5 to 30 parts by weight, of a surfactant or surfactant mixtures;
3) from 0.2 to 20 parts by weight, preferably from 0.4 to 10 parts by weight of an organic or inorganic sequestrant, capable to give bi- or poly-coordination bands, which forms with metal ions soluble complexes and prevents from forming insoluble salts of these metals;

and optionally:
4) from 0 to 60 parts by weight, preferably from 0 to 50 parts by weight of a solid lubricating compound, preferably selected from the following:

sulphides and selenides of the transition elements belonging to the groups VB and VIB of the Element Periodic Table, preferably molybdenum and tungsten, carbon compounds as graphite and $C_{60}$ and $C_{70}$ fullerenes.

The homopolimer or modified PTFE latex, containing particles with a diameter from 5 to 100 nm, can be obtained by radical tetrafluoroethylene polymerization in the presence of a microemulsion as described in EP 969,027 in the name of the Applicant, herein incorporated by reference. The microemulsions used in polymerization are described in U.S. Pat. Nos. 4,864,006 and 4,990,283.

The preferred nanoemulsions of the component 1) PTFE for the compositions according to the present invention contain particles having an average diameter from 10 to 80 nm, and are selected from the following classes:

homopolymer PTFE nanoemulsions;

modified PTFE nanoemulsions, i.e. TFE copolymers with one or more comonomers, containing at least one unsaturation of ethylene type, in an amount up to 6% molar, preferably up to 1% molar based on the polymer.

The comonomers which can be used to prepare the modified PTFE of the aqueous dispersions component 1), are both of hydrogenated and fluorinated type. Among the hydrogenated comonomers it can be mentioned: ethylene, propylene, acrylic monomers, for example methyl(meth) acrylate, (meth)acrylic acid, butylacrylate, hydroxyethylhexylacrylate, styrene monomers, such for example styrene.

Among the fluorinated comonomers it can be mentioned:

$C_3$–$C_8$ perfluoroolefins, for example hexafluoropropene (HFP);

$C_2$–$C_8$ hydrogenated fluoroolefins, such as vinyl fluoride (VF), vinylidene fluoride (VDF), trifluoroethylene, hexafluoroisobutene, $CH_2=CH-R_f$ perfluoroalkylethylene, wherein $R_f$ is a $C_1-C_6$ perfluoroalkyl for example $CF_3$, $C_2F_5$, $C_3F_7$;

$C_2-C_8$ chloro- and/or bromo- and/or iodo-fluoroolefins, for example chlorotrifluoroethylene (CTFE);

$CF_2=CFOR^A_f$ (per)fluoroalkylvinylethers (PAVE), wherein $R_f$ is a $C_1-C_6$ (per)fluoroalkyl as above;

$CF_2=CFOX^I$ (per)fluoro-oxyalkylvinylethers, wherein $X^I$ is a $C_1-C_{12}$ alkyl, or a $C_1-C_{12}$ oxyalkyl, or a $C_1-C_{12}$ (per)-fluoro-oxyalkyl having one or more ether groups, for example perfluoro-2-propoxy-propyl;

fluorodioxoles, preferably perfluorodioxoles.

Fluorinated comonomers are preferred, preferably those which do not compromise the thermal PTFE stability, in particular perfluoromethoxydioxole (MDO), perfluoropropylvinylether (PPVE), perfluoromethylvinylether (PMVE), perfluoroethylvinylether (PEVE) and perfluoropropene (PFP).

The surfactants component 2) can be anionic, cationic, non ionic and can be hydrogenated or fluorinated. Mixtures of surfactants, both ionic and nonionic, hydrogenated and fluorinated can be used.

Among hydrogenated surfactants those non ionic can be mentioned obtained by reaction of ethylenoxide (EO), which represents the hydrophilic part, with compounds capable to give to the structure an hydrophobic character, such for example the following:

propylenoxide (polypropylenoxide);

$C_8-C_{24}$ alcohols and aliphatic acids, both saturated and unsaturated;

primay, secondary, tertiary alkylamines, wherein an alkyl is $C_8-C_{24}$ and the other substituents are hydrogen or $C_1-C_5$ linear or branched alkyl;

alkylphenols, wherein the alkyl is as defined for alkylamines;

polycyclic hydrocarbons belonging to the terpene class, such for example β-pinene.

The compound obtained from the above reaction contains a polyoxyethylene chain having from 8 to 24 EO units.

Among non ionic hydrogenated surfactants those having the following structure are preferred:

polyethoxylated alkylphenols having formula:

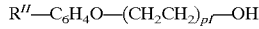

wherein:

$R''$ is a saturated or unsaturated, linear or branched alkyl chain having from 8 to 10 carbon atoms, pI=8–12;

etho-propoxylated alcohols having formula:

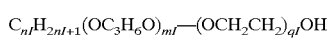

wherein:

nI=8–18, mI=0–30, qI=8–24;

polyethoxylated alcohols having formula:

wherein:

nII=8–24, preferably 8–18, mII=2–50, preferably 2–18.

Among anionic hydrogenated surfactants those having the following formula can for example be mentioned:

wherein:

$R^I_A$ is a $C_8-C_{18}$ aliphatic hydrocarbon radical, both saturated and unsaturated, having a linear or branched chain, for example an oleyl, stearyl, tridecyl, lauryl, decyl radical;

$M^A$ is an acid group such for example COO—, $SO_3$—;

$X^A$=H, $NH_4$, Na, Li, K.

Among cationic hydrogenated surfactants, the tetraalkylammonium salts can be mentioned wherein at least an alkyl is $C_8-C_{24}$ and the other substituents are hydrogen or $C_1-C_5$, linear or branched, alkyl.

Among anionic fluorinated surfactants those selected from the following classes can be mentioned:

$$T-O-R_f-CFX-COOM \quad (IA)$$

wherein:

X=F, $CF_3$;

M=H, $NH_4$, Na, Li, K;

T is a $C_1-C_3$ (per)fluoroalkyl group, optionally containing one Cl atom; preferably T is selected from the following: —$CF_3$, —$C_2F_5$, —$C_3F_7$, —$CF_2Cl$, —$C_2F_4Cl$, —$C_3F_6Cl$; optionally one or two F atoms can be substituted by H;

$R_f$ is a (per)fluoropolyoxyalkylene radical having a number average molecular weight $M_n$ in the range 200–2,000, preferably 350–1,000; $R_f$ is in particular selected from the following classes:

(a) —$(CF_2CF(CF_3)O)_m(CFXO)_n$— wherein m and n are integers such that the n/m ratio is in the range 0.01–0.5 and the molecular weight is within the above range;

(b) —$(CF_2CF_2O)_p(CF_2O)_q$— wherein p and q are integers such that the q/p ratio is in the range 0.5–2 and the molecular weight is within the above range;

(c) —$(CF_2CF(CF_3)O)_r$—$(CF_2CF_2O)_s$—$(CFXO)_t$— wherein r, s and t are integers such that r+s is in the range 1–50, the t/(r+s) ratio is in the range 0.01–0.05, X is F, $CF_3$, and the molecular weight is within the above range;

(d) —$(CF(CF_3)CF_2O)_u$— wherein u is an integer such that the molecular weight is within the above range;

(e) —$(CYZ-CF_2CF_2O)_v$— wherein Y and Z, equal to or different from each other, are F, Cl or H; v is an integer such that the molecular weight is within the above range;

(f) —$(CF_2CF_2O)_w$— w is an integer such that the molecular weight is within the above range.

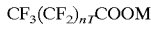  (IIA)

wherein nT can range from 4 to 12,

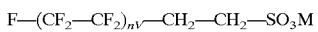  (IIIA)

wherein M is as above and nV ranges from 2 to 5.

Among the formula (IA) compounds, as anionic surfactants, those having the following formula

T-O—(C$_3$F$_6$O)$_m$(CF$_2$O)$_n$—CF$_2$—COOM wherein T, M, m and n are as above, are preferred.

The non ionic fluorinated surfactants are preferably selected from the following:

CF$_3$(CF$_2$)$_y$-L-R$_h$ (IB)

wherein y is an integer from 3 to 20, L and R$_h$ are as defined below;

T-O—R$_f$-L-R$_h$ (IIB)

wherein:
R$_f$ is selected among the above structures (a),(b),(c), (d),(e),(f);
L is a divalent organic group, linking group between R$_f$ and R$_h$, selected from —CO—NR$^1$—, —CH$_2$(OCH$_2$CHR$^2$)$_a$—O—, —CH$_2$(OCH$_2$CHR$^2$)$_b$—O—CO—, —CH$_2$O—(CH$_2$)$_c$—CO—O—, —CH$_2$—CH$_2$—O—, —CH$_2$—CH$_2$—;
wherein:
R$^1$ is —H or a C$_1$-C$_4$ alkyl;
R$^2$ is —H or a C$_1$-C$_2$ alkyl;
a, b are integers from 0 to 6, preferably from 0 to 2;
c is an integer from 1 to 3;
R$_h$ is a radical having a polyoxyalkylene structure selected from:
(i) —(CH$_2$CH$_2$O)$_{qI}$CH$_2$CH$_2$Z$_u$, wherein: qI is an integer from 5 to 70, preferably from 6 to 25; Z$_u$ is selected from —OH, C$_1$-C$_4$ alkoxy;
(ii) —(CH$_2$CH$_2$O)$_{rI}$(CH$_2$CH(CH$_3$)O)$_{sI}$CH$_2$CHR$^3$Z$_u$, wherein: rI+sI is an integer from 5 to 70, preferably from 10 to 50; the rI-/sI ratio is in the range 0.1–10, preferably 0.5–5; R$^3$ is selected between —H and —CH$_3$; Z$_u$ is as above;
T is as above.

Preferably the non ionic fluorinated surfactants are selected from the following:
structure (IB) compounds wherein y=5, L=—CH$_2$—CH$_2$—O—, R$_h$=—(CH$_2$CH$_2$O)$_{qI}$CH$_2$CH$_2$OH wherein qI=6; said compounds are marketed with the name FORAFAC 1110D®;
structure (IIB) compounds, wherein R$_f$ has structure (a), T=—C$_3$F$_6$Cl, m and n such to give a molecular weight in the range 450–650; L=—CONH—; R$_h$=—(CH$_2$CH$_2$O)$_{qI}$—CH$_2$CH$_2$OCH$_3$ wherein qI=21, said compounds are marketed with the name Fluorolink C455®.

The organic or inorganic sequestrants (complexants) component 3) usable in the invention are capable to give bi- or poly-coordination bands and form with metal ions soluble complexes and prevent from forming insoluble salts of said metals. Preferably the sequestrants have a functionality of acid type, for example of carboxylic or phosphonic type, in a number higher than or equal to two, preferably two or four. A test to verify if component 3) complies with the the present invention conditions is the following: to an aqueous solution at pH 10 containing a Ca$^{2+}$ soluble salt, preferably calcium nitrate, in an amount equal to 360 mg (as Ca$^{2+}$), 1 g of the sequestrant is added, and subsequently a water-soluble salt of an anion, preferably carbonate, which precipitates the calcium as insoluble salt. When an insoluble salt forms, component 3) is not suitable to be used in the present invention.

When the sequestrants are of inorganic type, they are for example selected from polyphosphates, for example sodium hexamethaphosphate Na$_6$P$_6$O$_{18}$, potassium pyrophosphate K$_4$P$_2$O$_7$, sodium tripolyphosphate Na$_5$P$_3$O$_{10}$.

When the sequestrants are of organic type, they are for example amino-polycarboxylic acids such as EDTA, polyhydroxy-monocarboxylic acids such as gluconic acid and phosphonates.

Among organic sequestrants the following are preferred:
(CH$_2$COOH)$_2$—N—CH$_2$—CH$_2$—N—(CH$_2$COOH)$_2$, ethylendiaminotetraacetic acid (EDTA);
(CH$_2$COOH)$_2$—N—CH$_2$—CH$_2$—N(CH$_2$COOH)(CH$_2$CH$_2$OH), N-hydroxyethyl-ethylendiaminotriacetic acid (HEDTA);
N—(CH$_2$COOH)$_3$, nitrilotriacetic acid (NTA);
CH$_3$—CH(H$_2$PO$_3$)$_2$, 1-hydroxyethyliden-1,1-diphosphonic acid (HEDP);
N(CH$_2$—PO$_3$H$_2$)$_3$, aminotrimethylenphosphonic acid (ATMP);
(H$_2$O$_3$P—CH$_2$)$_2$—N—CH$_2$—CH$_2$—N(H$_2$O$_3$P—CH$_2$)$_2$, ethylendiamino-tetramethylenphosphonic acid (EDTMP);
(H$_2$O$_3$P—CH$_2$)$_2$—N—CH$_2$—CH$_2$—N(CH$_2$PO$_3$H$_2$)—CH$_2$—CH$_2$—N(H$_2$O$_3$P—CH$_2$)$_2$ diethylentriamino pentamethylenphosphonic acid (DTPMP);
(H$_2$O$_3$P—CH$_2$)$_2$—N—(CH$_2$)$_6$—N(H$_2$O$_3$P—CH$_2$)$_2$, hexamethylendiaminote-tramethylenphosphonic acid (HMDTMP).

The optional component 4) is well known in the prior art and belongs to the class of the compounds used to lower the friction coefficient. Preferably it is selected from the following: MoS$_2$, WS$_2$ and graphite.

The present invention compositions can optionally be further diluted with water, and added with adhesion promoters, for example colloidal silica, Theological modifiers to regulate the viscosity, for example water-soluble polymers.

Before applying the invention compositions, the metal or steel substratum to be treated can optionally be pretreated with functionalized perfluoropolyethers. Preferably the perfluoropolyethers are mono or bifunctional. Still more preferably the end groups are ionic and of phosphate type. It has been found by the Applicant that the thicknesses of said functionalized perfluoropolyethers on the metal surface or steel can also be very thin, even at a monomolecular level.

The preferred mono- or diphosphate perfluoropolyethers have the following formula:

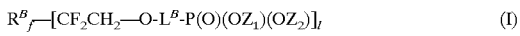
R$^B$$_f$—[CF$_2$CH$_2$—O-L$^B$-P(O)(OZ$_1$)(OZ$_2$)]$_l$ (I)

wherein l=1 or 2;
L$^B$ is a bivalent linking group, preferably of the type (CHR$_1$CHR$_2$O)$_{n''}$, wherein R$_1$, R$_2$ equal to or different from each other, are selected between H, CH$_3$; n'' is an integer in the range 1–50, preferably 1–6;
Z$_1$ equal to or different from Z$_2$ selected from H, alkaline or ammonium cation, di- or tri-alkanolammonium cation wherein the alkanol comprises from 1 to 20 C atoms, preferably 1–4 C atoms, di- or tri- or tetra-alkylammonium cation wherein the alkyl comprises from 1 to 20 C atoms, preferably 1–4 C atoms, or R$_f$—CF$_2$CH$_2$—O-L-;
R$^B$$_f$ represents a (per)fluoropolyether chain having number average molecular weight comprised between about 400 and about 1,800, preferably from 500 to 1,300, said (per)fluoropolyether chain comprising repeating units selected from one or more of the following:

a) $-(C_3F_6O)-$;

b) $-(CF_2CF_2O)-$;

c) $-(CFXO)-$, wherein X=—F, —$CF_3$;

d) $-CF_2(CF_2)_{z'}CF_2O-$, wherein z' is an integer 1 or 2;

e) $-CH_2CF_2CF_2O-$.

When $R^B{}_f$ is monofunctional (l=1), one end group is of the perfluoroalkyl type such for example $CF_3O$, $C_2F_5O$, $C_3F_7O$; optionally in the perfluoroalkyl end groups one fluorine atom can be substituted by one chlorine or hydrogen atom; examples of said fluoroalkyl end groups are $ClC_3F_6O$, $HC_3F_6O$;

when $R^B{}_f$ is of the bifunctional (per)fluoropolyether type and it has preferably one of the following structures:

1) $-(CF_2O)_{a'}-(CF_2CF_2O)_{b'}-$ with b'/a' comprised between 0.3 and 10, extremes included, a' and b' being integers and a' different from 0;

2) $-(CF_2-(CF_2)_{z'}-CF_2O)_{b'}-$ wherein z' is an integer equal to 1 or 2;

3) $-(C_3F_6O)_{r'}-(C_2F_4O)_{b'}-(CFXO)_{t'}-$ with r'/b'=0.5–2.0 (r'+b')/t'=10–30, b' and t' being different from 0;

4) $-(OC_3F_6)_{r'}-(CFXO)_{t'}-OCF_2-R^{B'}{}_f-CF_2O-(C_3F_6O)_{r'}.13(CFXO)_{t'}-$;

5) $-(CF_2CF_2CH_2O)_{q'}-R^{B'}{}_f-O-(CH_2CF_2CF_2O)_{q'}-$ wherein:

$R^{B'}{}_f$ is a fluoroalkylene group from 1 to 4 carbon atoms; r', t', q' are integers, X=F, $CF_3$;

6) $-(C_3F_6O)_{r'}-OCF_2-R^{B'}{}_f-CF_2O-(C_3F_6O)_{r'}-$ wherein in said formulas:

$-(C_3F_6O)-$ can represent units of formula:

$-(CF(CF_3)CF_2O)-$ and/or $-(CF_2-CF(CF_3)O)-$ a', b', q', r', t', are integers, the sum of which is such that $R^{B'}{}_f$ shows number average molecular weight Mn values comprised between about 400 and about 1,800, preferably between 500 and 1,500.

The preferred (per)fluoropolyether chain $R^B{}_f$ is selected from the following structures:
from those bifunctional (l=2):

$-(CF_2O)_{a'}-(CF_2CF_2O)_{b'}-$;

$-(C_3F_6O)_{r'}-(C_2F_4O)_{b'}-(CFXO)_{t'}-$;

from those monofunctional (l=1):

$-(C_3F_6O)_{r'}-(CFL_0O)_{t'}-$;

wherein X and the indexes a', b', r', t' have the above value, still more preferably $-(CF_2O)_{a'}-(CF_2CF_2O)_{b'}-$, wherein the indexes a' and b' have the above values.

The preferred compounds of formula (I) are those wherein $L_B=(CH_2-CH_2O)_{n''}$ with n'' integer from 1 to 3; $Z_1$ equal to or different from $Z_2$ is selected from H, $NH_4$, or an alkaline metal cation; l=2.

The (per)fluoropolyethers of general formula (I) are obtainable by the well known processes of the prior art, see for example the following patents, herein incorporated by reference: U.S. Pat. Nos. 3,665,041, 2,242,218, 3,715,378, EP 239,123, EP 1,145,722.

The invention compositions are applied on metals, steels, with conventional methods such as casting, spraying, glazing, spin coating, deep coating also without pretreating the metal surface. For example by using the spin coating, a constant spinning rate in the range 2,000–5,000 rpm is preferably used; the time is generally comprised between 30 seconds and 5 minutes.

After the application on the metal surface the obtained film is sintered at a temperature higher than 320° C., preferably in the range 390° C.–410° C.; subsequently the sintered film is cooled by air exposure.

As said, the present invention compositions show the excellent combination of the above properties.

The films obtained by applying to metal substrata the compositions according to the present invention show an excellent adhesion to the support. This is surprising and unexpected on the basis of the prior art since tests carried out by the Applicant on compositions having the same composition as those of the present invention, but using a latex wherein the PTFE particles have sizes higher than those of the present invention component 1), give films which substantially do not adhere to metal supports. See the Examples.

The following aspects of the compositions according to the present invention result, on the basis of the prior art, quite unexpected:

the fact that the addition of sequestrants made it possible to improve the scratch, i.e. to improve the adhesion to the film metal support and its mechanical resistance;

the fact that the addition of the optional solid lubricants, for example molybdenum sulphide, in combination with sequestrants made it possible to improve further the wear resistance and the adhesion to the support (improved scratch).

The following Examples are given for illustrative purposes, but they are not limitative of the scope of the invention.

EXAMPLES

Characterization

Particle Diameter

The particle diameter is measured by a laser light scattering instrument, in particular Photon Correlation Spectroscopy, equipped with Brookhaven correlator model 2030 AT and with an argon laser light source at a wave length of 514.5 nm by Spectra-Physics. The latex samples to be evaluated are previously diluted with water filtered at 0.2 μm on Milli-pore filter until the instrument signal is not within the scale. The scattering measure is carried out at room temperature (20° C.–25° C.) at a 90° angle. The latex particle diameter is obtained by the cumulant method.

Polymer Content in the Latex

About 3 grams of latex are weighed in a glass beaker and put in a stove to dry for 2 hours at 105° C. and then sintered at 380° C. for 15 minutes. The content of dry product of the latex is obtained from the formula: dry product %=100× weight after sintering/latex initial weight.

Surfactant Content in the Latex

The difference between the solid weight after drying at 105° C. and the final weight after sintering gives the amount of the present surfactant.

First Melting Temperature Determination

The first melting temperature determination is carried out by the differential calorimetry technique by using a Perkin Elmer calorimeter of the DSC 7 type. About 10 mg of the dried polymer are heated from the temperature of 220° C. up to the temperature of 370° C. at a rate of 10° C./min. The temperature corresponding to the peak of the melting endothermic curve is indicated as the first melting temperature of the polymer.

Wetting Capability

The wetting capability of the formed latex, after application on the substratum (aluminum, copper, steel, stainless steel sheets), is visually evaluated by observing the behaviour of the film spread by casting on the substratum. The wetting capability is considered sufficient when the homogeneous substratum covering, without defects is obtained. The wetting capability is considered insufficient when "islands" of unwet substratum are formed.

Film Thickness Determination

The film thickness is measured according to ASTM B 499.

Presence Determination of Cracks in the Film

The crack presence is noticed by examining the film by a 40 magnification optical microscope.

Film Adhesion to the Substratum

The adhesion is evaluated with the following alternative methods:
  cross cut method (ASTM D 3359-87);
  one scratches the film with a steel spherical point having a diameter of 0.4 mm, with an applied load of 600 g, and one observes at the 40 magnification optical microscope:
    a) if the film surface shows a crack with detachment, with formation of a "V" crack;
    b) or if the film gets scratched without detaching itself from the substratum.

The specimen passes the test if the film remains adherent to the substratum (case b)).

Film Scratch Resistance

The film scratch resistance is measured by observing with a reflecting optical microscope the scratch behaviour of the film adhering to the substratum. The test is an index of the film adhesion to the substratum and of the film mechanical resistance. The substratum covered by the polymer film is observed at the 40 magnification stereo microscope. With a steel spherical point having a diameter of 0.4 mm, with an applied load of 100 g, the surface is cut with circular trajectory counting about 5 rotatory movements (cycles) on a film surface having 2×2 mm sizes.

The film specimen is evaluated as follows:
  if the film remains integral for the whole test, the scratch resistance is put equal to 3;
  if the film is cut between the third and fourth cycle, the scratch resistance is put equal to 2;
  if the film is cut by the spherical point during the first 2 cycles, the scratch resistance is put equal to 1.

Friction Coefficient

The friction coefficient is measured by the ASTM D 1894 method.

Resistance of the Film to Wear

To the specimen a steel spherical point having a diameter of 0.95 mm is applied with a load of 50 or 100 g. The point is let drag on the film at a rate of 800 mm/min. By using a 40 magnification optical microscope one notices if at the edges of the incision groove, shavings of removed material are present. The presence of shavings shows that the film in the test conditions is subject to wear.

By the microscope, using a millesimal comparator, one determines the groove width, which is taken as film hardness index.

Example 1
Polymerization of a Homopolymer PTFE Nanoemulsion

In a glass reactor there are introduced:

5 parts of an anionic perfluorinated surfactant having structure (IA):

$$ClC_3F_6O(C_3F_6O)_nCF_2COONH_4 \quad \text{(IA)}$$

wherein n is such that the acidimetrical molecular weight is equal to 530;

3 parts of a perfluoropolyether having structure:

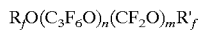

wherein n and m are integers such to give a number average molecular weight of about 700; $R_f$, $R'_f$, equal to or different from each other are perfluoroalkyls from 1 to 3 carbon atoms;

8 parts of water.

The resulting microemulsion results perfectly limpid.

3810 grams of the obtained microemulsion are added to 29 liters of carefully degassed water into a 50 liter autoclave equipped with a mechanical stirrer and previously put under vacuum. Also 140 grams of paraffin with softening point in the range 52° C.–54° C. had been previously introduced into the reactor. 900 mbar ($9.10^4$ Pa) of ethane are fed to the autoclave. The autoclave is kept under mechanical stirring and is pressurized with tetrafluoroethylene (TFE) up to a pressure of 20 bar (2 MPa) at a temperature of 88° C. At this point 500 cc of solution of $(NH_4)_2S_2O_8$ (APS) corresponding to 5,000 mg of APS are fed to the autoclave as polymerization initiator.

When the pressure in the reactor has decreased of 0.5 bar ($5.10^4$ Pa), one starts to feed TFE by means of a compressor so as to maintain a constant pressure of 20 bar inside the reactor. In the meantime the reactor internal temperature is increased up to 100° C. at a rate equal to 0.7° C./min. After 32 minutes, the TFE feeding is stopped, the reactor evacuated and cooled.

The polymer primary particle diameter measured by Laser Light Scattering (LLS) is equal to 17 nm. The discharged latex has a concentration of 312 g PTFE/kg dispersion. The PTFE latex contains a concentration by weight of anionic perfluorinated surfactant equal to 8.65% based on the PTFE.

By the DSC analysis it results that the obtained polymer has a first melting temperature of 323.6° C.

To 10 kg of said dispersion, put in a thermostatable Pyrex glass reactor, 6 kg of a solution at 25% by weight of Triton X-100 are added. The mixture, initially at room temperature, is carefully homogenized and the temperature increased up to 71° C. At this temperature stirring is stopped and an upper clear aqueous phase and a lower phase having a high content of fluorinated polymer particles separate. The lower phase contains an amount of fluorinated polymer equal to 43% by weight and of Triton X-100 equal to 6.4% by weight.

Example 1A

Preparation of a film according to the invention by formulating the polymerization latex of Example 1 with a sequestrant additive (diphosphonate potassium salt) using a not pretreated steel plate.

To prepare the film the latex is formed as follows (percentages by weight referred to the weight of the total dispersion):

| | |
|---|---|
| PTFE | 20% |
| Triton X-100 | 4% |
| Ammonium perfluorooctanoate (PFOA) | 1% |
| Potassium salt of the hydroxyethyliden-1,1-diphosphonic acid (Sequion ® 10K44) | 0.15% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 2
Polymerization of a Modified PTFE Nanoemulsion 1503 grams of the microemulsion obtained as in Example 1 are added to 29 liters of carefully degassed water in a 50 liter autoclave equipped with a mechanical stirrer and previously put under vacuum. Also 210 grams of paraffin with softening point in the range 52° C.–54° C. had been previously introduced into the reactor. 125 grams of perfluoromethylvinylether (MVE) are fed to the autoclave. The autoclave is kept under mechanical stirring and is pressurized with tetrafluoroethylene (TFE) up to a pressure of 20 bar ($2.10^6$ Pa) at a temperature of 80° C. At this point 85 ml of solution of $(NH_4)_2S_2O_8$ (APS) corresponding to 850 mg of APS are fed to the autoclave as polymerization initiator.

When the pressure in the reactor has decreased of 0.5 bar ($5.10^4$ Pa), one starts to feed TFE by means of a compressor so as to maintain a constant pressure of 20 bar inside the reactor. In the meantime the reactor internal temperature is increased up to 85° C. with a gradient of 0.25° C./min. After 120 minutes, the TFE feeding is stopped, the reactor evacuated and cooled.

The polymer primary particle diameter measured by Laser Light Scattering (LLS) results equal to 72 nm. The discharged latex has a concentration of 330 g PTFE/kg dispersion. The modified PTFE latex contains a concentration by weight of anionic perfluorinated surfactant equal to 3.16% based on the PTFE.

To 10 kg of this dispersion, put in a thermostatable Pyrex glass reactor, 6 kg of a solution at 25% by weight of Triton X-100 are added. The mixture, initially at room temperature, is carefully homogenized and the temperature increased up to 70° C. At this temperature stirring is stopped and an upper clear aqueous phase and a lower phase having a high content of fluorinated polymer particles separate. The lower phase contains an amount of fluorinated polymer equal to 49.3% by weight and of Triton X-100 equal to 7.3% by weight.

By the DSC analysis it results that the obtained polymer has a first melting temperature of 321.6° C. By the TGA analysis it is determined a weight loss of 0.98% by weight at 425° C. in 2 hours, which is an index of good thermal stability.

Example 2A
Preparation of a film according to the invention by formulating the polymerization latex of Example 2 with a sequestrant additive (diphosphonate potassium salt) and application on the steel plate treated with PFPE phosphate The latex obtained in Example 2 is formed as follows

| | |
|---|---|
| Modified PTFE | 30% |
| Triton X-100 | 4% |
| Potassium salt of the hydroxyethyliden-1,1-diphosphonic acid (Sequion ® 10K44) | 0.15% |

The substratum (steel plate) is previously treated with an hydroalcoholic emulsion (water/isopropyl alcohol 20/80) at 2% by weight of Fluorolink® F10 under the form of ammonium salt, chemically defined as a bifunctional PFPE phosphate, having number average molecular weight of about 1,500, corresponding to the following formula:

wherein:

n", a and b being such as to give the indicated molecular weight.

The hydroalcoholic emulsion is spread on the plate, which is then dried at 60° C. After drying the possible compound excess is removed for example by hand, by rubbing with a cloth.

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 3 (Comparative)
Polymerization of a Homopolymer PTFE Emulsion 11 grams of the aqueous solution of ammonium perfluorooctanoate and 31 liters of carefully degassed water are fed to a 50 liter autoclave equipped with a mechanical stirrer and previously put under vacuum. Also 140 grams of paraffin with softening point in the range 52° C.–54° C. had been previously introduced into the reactor. The autoclave is kept under mechanical stirring and is pressurized with tetrafluoroethylene (TFE) up to a pressure of 20 bar ($2.10^6$ Pa) at a temperature of 62° C. Successively 500 ml of a solution of $(NH_4)_2S_2O_8$ (APS) and disuccinic peroxide (DSAP) corresponding to 150 mg of APS and 3,000 mg of DSAP are fed.

When the pressure in the reactor has decreased of 0.5 bar ($5.10^4$ Pa), one starts to feed TFE by means of a compressor so as to maintain a constant pressure of 20 bar inside the reactor. In the meantime the reactor internal temperature is increased up to 80° C. at a rate equal to 0.5° C./min. During the reaction 50.5 grams of the aqueous solution at 100 grams/liter of ammonium perfluorooctanoate (PFOA) are fed to the autoclave. After 90 minutes, the TFE feeding is stopped, when 15,800 grams of TFE have reacted, the reactor is vented and cooled. The latex discharged from the reactor has a concentration of 510 g PTFE/liter of water.

The polymer primary particle diameter measured by Laser Light Scattering (LLS) is equal to 230 nm. The obtained PTFE latex is concentrated up to a PTFE concentration equal to 60% by weight. The PTFE latex contains a concentration by weight of anionic perfluorinated surfactant PFOA equal to 0.08% b<sfd on the PTFE.

To 10 kg of this dispersion, put in a thermostatable Pyrex glass reactor, 2 kg of a solution at 25% by weight of Triton X-100 are added. The mixture, initially at room temperature, is carefully homogenized and the temperature increased up to 69° C. At this temperature stirring is stopped and an upper clear aqueous phase and a lower phase having a high content of fluorinated polymer particles separate. The lower phase contains an amount of fluorinated polymer equal to 66% by weight and of Triton X-100 equal to 1.49% by weight.

The DSC analysis shows that the polymer has a first melting temperature of 343° C.

Example 4
Preparation of a Film According to the invention Using the Composition of Example 1A by Application on a Steel Plate Treated with Fluorolink® F10

The substratum (steel plate) is previously treated with Fluorolink® F10 as described in Example 2A.

The latex formed as in Example 1A is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 5
Preparation of a Film According to the Invention Using a Not Pretreated Steel Plate, Adding to the Composition of Example 1A a Solid Lubricant (Molybdenum Sulphide)

To prepare the film the latex is formed as follows (percentages by weight referred to the weight of the total dispersion):

| | |
|---|---|
| PTFE | 20% |
| Triton X-100 | 4% |
| PFOA | 1% |
| Potassium salt of the hydroxyethyliden-1,1-diphosphonic acid (Sequion ® 10K44) | 0.15% |
| Molybdenum sulphide | 4% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 6
Preparation of a Film According to the Invention Using a Not Pretreated Steel Plate, by Adding to the Composition of Example 2A a Solid Lubricant (Molybdenum Sulphide)

To prepare the film the latex is formed by omitting the surfactant PFOA, as follows (percentages by weight referred to the weight of the total dispersion):

| | |
|---|---|
| Modified PTFE | 20% |
| Triton X-100 | 4% |
| Potassium salt of the hydroxyethyliden-1,1-diphosphonic acid (Sequion ® 10K44) | 0.15% |
| Molybdenum sulphide | 4% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 7
Preparation of a Film According to the Invention by Applying the Composition of Example 1A on a Not Pretreated Aluminum Plate Example 1A is repeated but by applying the latex to a not pretreated plate of aluminum at the place of steel. The characterization is reported in Table I.

Example 8
Preparation of a Film According to the Invention by Applying the Composition of Example 1A on a Not Pretreated Copper Plate Example 1A is repeated but by applying the latex to a not pretreated plate of copper at the place of steel. The characterization is reported in Table I.

Example 9
Preparation of a Film by Using a Not Pretreated Steel Plate According to the Invention by Forming the Polymerization Latex of Example 1 with a Sequestrant Additive To prepare the film the latex is formed as follows (percentages by weight referred to the weight of the total dispersion):

| | |
|---|---|
| PTFE | 20% |
| Triton X-100 | 4% |
| Ammonium perfluorooctanoate (PFOA) | 1% |
| Ethylendiaminotetraacetic acid disodic salt | 0.15% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table I.

Example 10 (Comparative)
Preparation of a Film by Using a Not Pretreated Steel Plate, Starting from a Composition as in Example 1A but without the Sequestrant Additive For the application (film preparation) the latex is formed as follows (percentages by weight referred to the weight of the total dispersion):

| | |
|---|---|
| PTFE | 20% |
| Triton X-100 | 4% |
| PFOA | 1% |

The so prepared latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

Example 11 (Comparative)
Preparation of a Film by Using a Not Pretreated Steel Plate, Starting from a Composition as in Example 2A but without the Sequestrant Additive The latex obtained in Example 2 is formed as follows:

| | |
|---|---|
| Modified PTFE | 30% |
| Triton X-100 | 4% |

The so prepared latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

Example 12 (Comparative)
Preparation of a Film by Using a Not Pretreated Steel Plate, by Forming the Polymerization Latex of Example 3 (Emulsion Polymerization) with a Sequestrant Additive (Diphosphonate Potassium Salt)

To prepare the film the latex is formed as follows (percentages by weight referred to the weight of the total dispersion):

| | |
|---|---|
| PTFE | 20% |
| Triton X-100 | 3% |
| Ammonium perfluorooctanoate (PFOA) | 1% |
| Potassium salt of the hydroxyethyliden-1,1-diphosphonic acid (Sequion ® 10K44) | 0.15% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

Example 13 (Comparative)
Preparation of a Film by Using a Not Pretreated Steel Plate Starting from a Mixture of the Latexes Obtained Respectively in the Example 3 (Comparative) and in Example 2 by Adding a Sequestrant Additive (Diphosphonate Potassium Salt)

The latex mixture is prepared using an amount of the latex of Example 3 (comparative) and respectively of Example 2 such that the ratio between the PTFE from emulsion polymerization and the modified PTFE from microemulsion polymerization is 95:5 by weight based on the solid.

To prepare the film the latex mixture is formed as follows (percentages by weight referred to the weight of the total dispersion):

| | |
|---|---|
| PTFE + mod. PTFE | 60% |
| Triton X-100 | 3.5% |
| Potassium salt of the hydroxyethyliden-1,1-diphosphonic acid (Sequion ® 10K44) | 0.15% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

Example 14 (Comparative)
Preparation of a Film According to the Invention, by Using a Not Pretreated Steel Plate, by Forming the Latex of Example 1A with a Filler (Titanium Dioxide)

To prepare the film the latex is formed as follows (percentages by weight referred to the weight of the total dispersion):

| | |
|---|---|
| PTFE | 20% |
| Triton X-100 | 4% |
| PFOA | 1% |
| Potassium salt of the hydroxyethyliden-1,1-diphosphonic acid (Sequion ® 10K44) | 0.15% |
| Titanium dioxide | 10% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

Example 15 (Comparative)
Preparation of a Film by Using a Not Pretreated Steel Plate by Forming the Latex of Example 2A with a Solid Lubricant To prepare the film the latex is formed by omitting the PFOA surfactant, as follows (percentages by weight referred to the weight of the total dispersion):

| | |
|---|---|
| Modified. PTFE | 20% |
| Triton X-100 | 4% |
| Molybdenum sulphide | 4% |

The so formed latex is deposited by casting, with a slope of 40°–50°, on a steel plate previously treated in an oven at 400° C. for 20 minutes. Then it is dried at 120° C. in a ventilated stove and the so formed film is treated in an oven at 400° C. for 4 min. to allow the polymer sintering. The characterization is reported in Table II.

TABLE I

| | | | | | | | | | Wear | | |
|---|---|---|---|---|---|---|---|---|---|---|---|
| | | | | | | | | | | Incision width | |
| | | | Thick- | | | | | Frict- | | | |
| | | Latex | ness | | Adhesion | | | ion | Load | Load | Shavings |
| Ex. | Support | ex. | μm | Cracks | Microsc. | ASTM | Scratch | coeff. | 50 g | 100 g | present |
| 1A | steel | 1 | 1 ÷ 2 | — | yes | 5B | 2 | 0.12 | 92 | 120 | yes |
| 2A | steel | 2 | 1 ÷ 2 | — | yes | 3B | 2 | 0.12 | 102 | 118 | no |
| 4 | steel | 1 | 1 ÷ 2 | — | yes | 5B | 2 | 0.11 | 118 | 141 | yes |
| 5 | steel | 1 | 1 ÷ 2 | — | yes | 5B | 3 | 0.11 | 40 | 64 | no |
| 6 | steel | 2 | 1 ÷ 2 | — | yes | 5B | 3 | 0.10 | 45 | 50 | no |
| 7 | alum. | 1 | 3 | — | yes | 5B | 2 | 0.12 | 80 | 120 | no |
| 8 | copper | | | | | | | | | | |
| 9 | steel | 1 | 1 ÷ 2 | — | yes | 5B | 2 | 0.12 | 65 | 115 | yes |

TABLE II

| Ex. | Support | Latex ex. | Thickness μm | Cracks | Adhesion Microsc. | Adhesion ASTM | Scratch | Friction coeff. | Wear Incision width Load 50 g | Wear Incision width Load 100 g | Shavings present |
|---|---|---|---|---|---|---|---|---|---|---|---|
| 10 comp | steel | 1 | 1 ÷ 2 | — | yes | 5B | 1 | 0.10 | 86 | 100 | yes |
| 11 comp | steel | 2 | 1 ÷ 2 | — | yes | 4B | 1 | 0.11 | 85 | 95 | yes |
| 12 comp | steel | 3 | 4 | — | no | 0B | — | — | — | — | — |
| 13 comp | steel | 3 + 2 | — | yes | no | 0B | — | — | — | — | — |
| 14 comp | steel | 1 | 1 ÷ 2 | — | yes | 3B | 1 | 0.20 | 120 | 130 | yes |
| 15 comp | steel | 2 | 1 ÷ 2 | — | yes | 3B | 1 | 0.12 | 80 | 90 | no |

What is claimed is:

1. A method of treating metal substrata or steels, comprising applying compositions to metal substrata or steels, then sintering the PTFE, wherein the compositions are based on PTFE, homopolymer or modified, comprising 100 parts of the PTFE of component:

1) an aqueous nanodispersion, or latex, of said homopolymer or modified PTFE, having a primary particle diameter from 5 to 100 nm;
2) from 3 to 45 parts by weight of a surfactant or surfactant mixtures;
3) from 0.2 to 20 parts by weight of an organic or inorganic sequestrant capable to give bi- or polycoordination bands, which forms with metal ions soluble complexes and prevents from forming insoluble salts of said metals;

and optionally:

4) from 0 to 60 parts by weight of a solid lubricating compound.

2. The method according to claim 1, wherein the metal substratum is pretreated with functionalized perfluoropolyethers.

3. The method according to claim 2, wherein the perfluoropolyethers have the following formula:

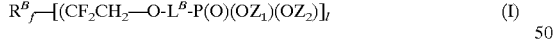

$$R^B_f-[(CF_2CH_2-O-L^B-P(O)(OZ_1)(OZ_2)]_l \quad (I)$$

wherein l=1 or 2;

$L^B$ is a bivalent linking group, of the type $(CHR_1CHR_2O)_{n''}$ wherein $R_1$, $R_2$ equal to or different from each other are selected between H, $CH_3$; n" is an integer in the range 1–50;

$Z_1$ equal to or different from $Z_2$ selected from H, alkaline or ammonium cation, di- or tri-alkanolammonium cation wherein the alkanol comprises from 1 to 20 C atoms, di- or tri- or tetra-alkylammonium cation wherein the alkyl comprises from 1 to 20 C atoms or $R_f$—$CF_2CH_2$—O-L-;

L is a divalent organic group, linking group between $R_f$ and $R_h$, selected from —CO—NR$^1$—, 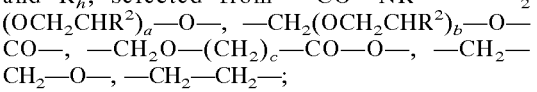—$CH_2$(OCH$_2$CHR$^2$)$_a$—O—, —CH$_2$(OCH$_2$CHR$^2$)$_b$—O—CO—, —CH$_2$O—(CH$_2$)$_c$—CO—O—, —CH$_2$—CH$_2$—O—, —CH$_2$—CH$_2$—;

wherein:
$R^1$ is —H or a $C_1$–$C_4$ alkyl;
$R^2$ is —H or a $C_1$–$C_2$ alkyl;
a, b are integers from 0 to 6;
c is an integer from 1 to 3;
$R^B_f$ represents a (per)fluoropolyether chain having number average molecular weight comprised between about 400 and about 1,800, said (per)fluoropolyether chain comprising repeating units selected from one or more of the following:
a) —($C_3F_6O$)—;
b) —($CF_2CF_2O$)—;
c) —(CFXO)—, wherein X=F, —$CF_3$;
d) —$CF_2(CF_2)_{z'}CF_2O$—, wherein z' is an integer 1 or 2;
e) —$CH_2CF_2CF_2O$—.

4. The method according to claim 3, wherein:
when $R^B_f$ is monofunctional (l=1), one end group is of the perfluoroalkyl type, and in the perfluoroalkyl end groups one fluorine atom can be substituted or not substituted by one chlorine or hydrogen atom;
when $R^B_f$ is of the bifunctional (per)fluoropolyether type, it has one of the following structures:

1) —$(CF_2O)_{a'}$—$(CF_2CF_2O)_{b'}$—
with b'/a' comprised between 0.3 and 10, extremes included, a' and b' being integers and a' different from 0;

2) —$(CF_2$—$(CF_2)_z$—$CF_2O)_{b'}$—
wherein z' is an integer equal to 1 or 2;

3) $(C_3F_6O)_{r'}$—$(C_2F_4O)_{b'}$—$(CFXO)_{t'}$—
with r'/b'=0.5–2.0 (r'+b')/t'=10–30, b' and t' being different from 0;

4) —$(OC_3F_6)_{r'}$—$(CFXO)_{t'}$—$OCF_2$—$R^{B'}_f$—$CF_2O$—$(C_3F_6O)_{r'}$—$(CFXO)_{t'}$—;

5) —$(CF_2CF_2CH_2O)_{q'}$—$R^{B'}_f$—O—$(CH_2CF_2CF_2O)_{q'}$—
wherein:
$R^{B'}_f$ is a fluoroalkylene group from 1 to 4 carbon atoms; r', t', q' are integers, X=F, $CF_3$;

6) —$(C_3F_6O)_{r'}$—$OCF_2$—$R^{B'}_f$—$CF_2O$—$(C_3F_6O)_{r'}$—
wherein in said formulas:
—($C_3F_6O$)— can represent units of formula:

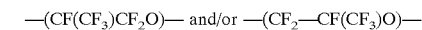

—(CF(CF$_3$)CF$_2$O)— and/or —(CF$_2$—CF(CF$_3$)O)— a', b', q', r', t', are integers, whose sum is such that $R^B_f$ shows number average molecular weight Mn values comprised between about 400 and about 1,800.

5. The method according to claim 4, wherein $R^B_f$ is selected from the following structures:

from those bifunctional (l=2):

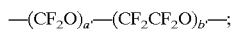

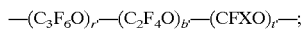

from those monofunctional (l=1):
one end group is of the perfluoroalkyl type and the remaining part of the chain is $(C_3F_6O)_{r'}-(CFXO)_{t'}-$;
wherein X and the indexes a', b', r', t' have the above value, wherein the indexes a' and b' have the above values.

6. The method of claim 5, wherein $R^B_f = -(CF_2O)_{a'}-(CF_2CF_2O)_{b'}-$.

7. The method of claim 4, wherein the Mn values comprised between 500 and 1,500.

8. The method of claim 3, wherein n" is an integer in the range 1–6.

9. The method of claim 3, wherein the alkyl comprises from 1 to 4 C atoms.

10. The method of claim 2, wherein the functionalized perfluoropolyethers are mono or bifunctional.

11. The method of claim 2, wherein the functionalized perfluoropolyethers have ionic phosphate end groups.

12. The method according to claim 1, wherein the compositions are applied by casting, spraying, glazing, spin coating, deep coating.

13. Metal substrata or steels treated with the compositions according to claims 1, optionally pretreated with functionalized perfluoropolyethers.

14. Metal substrata or steels according to claim 13, wherein the functionalized perfluoropolyethers are mono or bifunctional.

15. Metal substrata or steels according to claim 13, wherein the functionalized perfluoropolyethers have ionic phosphate end groups.

16. Coatings obtainable by applying the compositions of claim 1 to a substrate.

* * * * *